Oct. 5, 1926.

C. BETHEL 1,602,298

FLEXIBLE GEAR

Filed Sept. 8, 1923   2 Sheets-Sheet 1

WITNESSES:

INVENTOR
Claude Bethel.
BY
ATTORNEY

Oct. 5, 1926.
C. BETHEL
1,602,298
FLEXIBLE GEAR
Filed Sept. 8, 1923  2 Sheets-Sheet 2
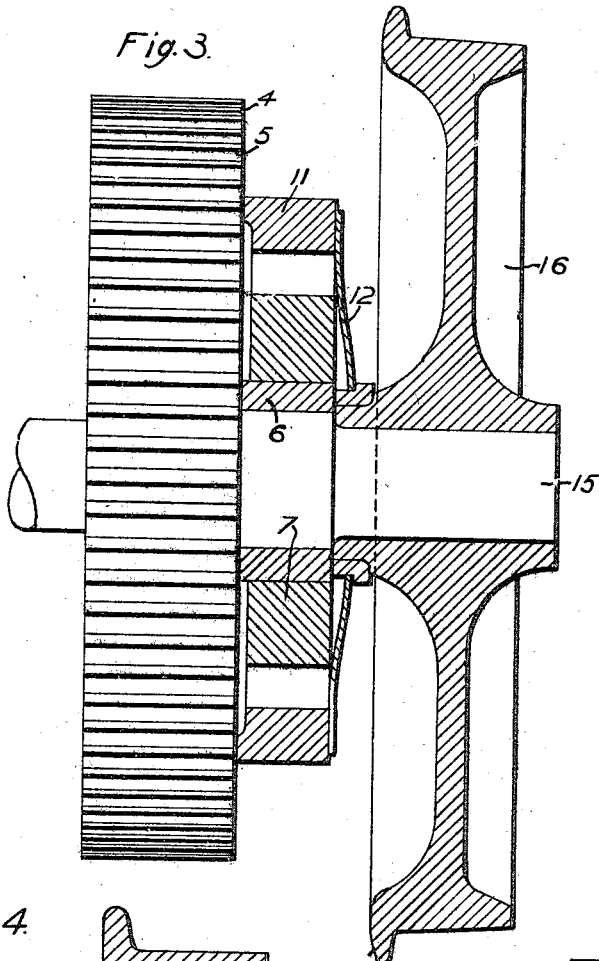
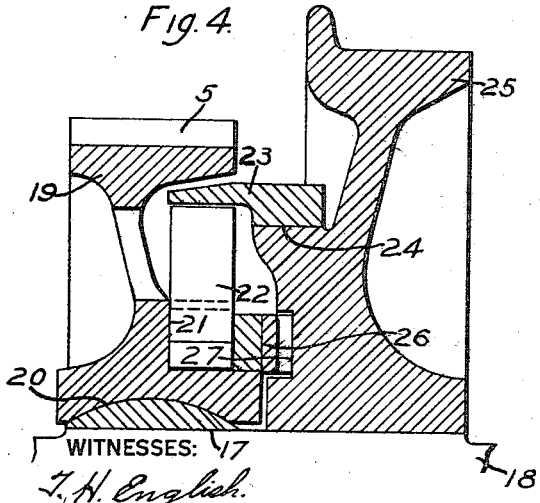
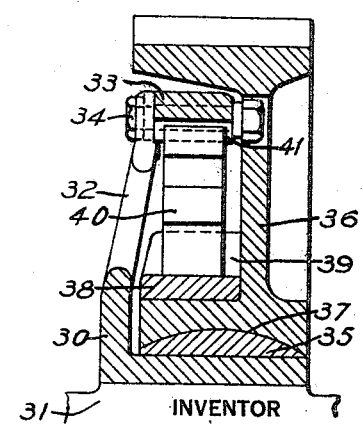
INVENTOR
Claude Bethel.
BY
Wesley G. Carr
ATTORNEY Patented Oct. 5, 1926.

1,602,298

UNITED STATES PATENT OFFICE.

CLAUDE BETHEL, OF WILKINSBURG, PENNSYLVANIA, ASSIGNOR TO WESTINGHOUSE ELECTRIC & MANUFACTURING COMPANY, A CORPORATION OF PENNSYLVANIA.

FLEXIBLE GEAR.

Application filed September 8, 1923. Serial No. 661,554.

My invention relates to gear-wheels, more especially to gear-wheel structures embodying flexible elements which are especially designed to find application in drive mechanisms that are subjected to shock and misalinement of the rotating parts.

It is among the objects of my invention to provide a gear-wheel of the above-designated character which shall be of simple, compact and durable mechanical construction and which shall be efficient in the specific function for which it is to be employed.

A great many designs of flexible gear elements have been heretofore proposed which were usually designed and constructed for some specific application or use, but the common purpose of them all is to obtain a degree of resilience between the tooth portion of the gear rim and the supporting or driving hub member. The design of the flexible element varies with the amount of torque to be transmitted, the degree of flexibility required and the service conditions under which it operates.

My present invention is directed to a flexible gear element embodying some of the features of prior devices, but having a novel construction of hub and rim and a flexible connection therebetween which permits of certain relative movements of the co-operating parts that are not obtainable in devices heretofore proposed.

My construction is based upon the need of a gear element in a drive mechanism comprising a plurality of cooperating shafts that will permit of misalinement or distortion of the shaft members without affecting the meshing of the gear teeth. The hub and rim and connecting flexible element of my device are so designed as to permit of universal movement of the hub relative to the rim without stressing or distorting the point of contact of the gear teeth and it further comprises novel features of construction that will be more fully hereinafter set forth.

Figure 1:
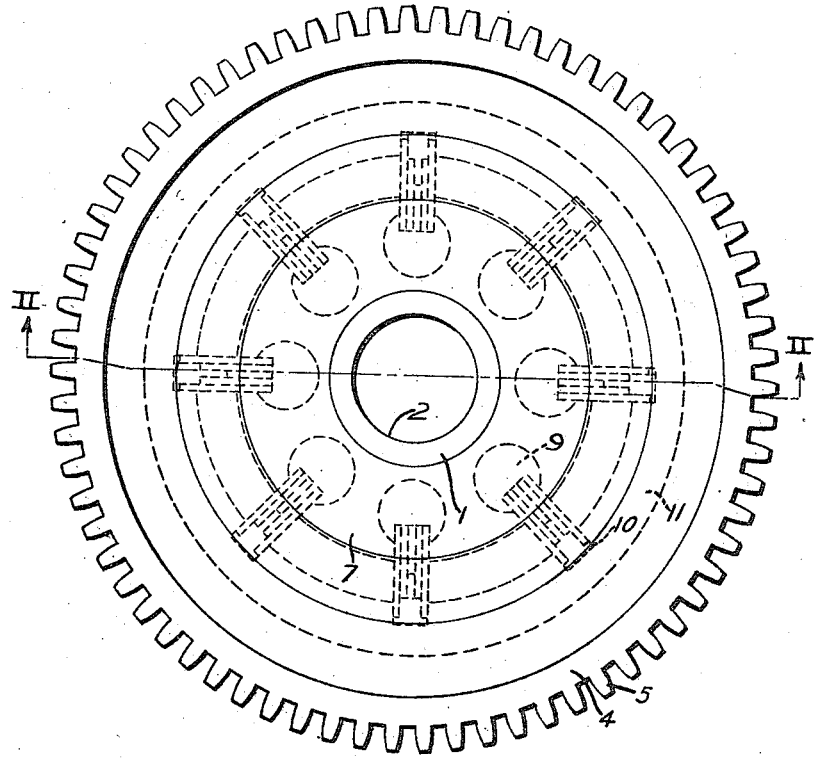
Figure 2:
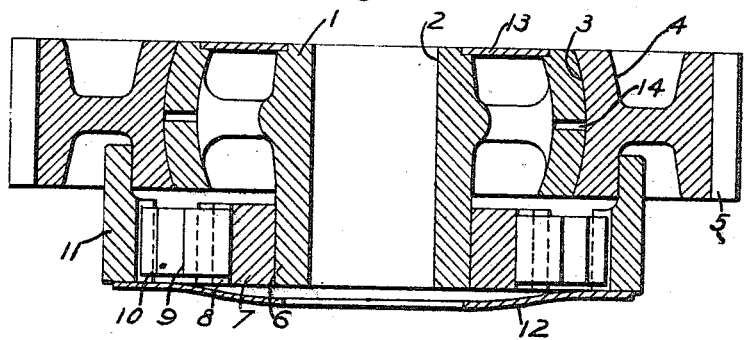

In the accompanying drawings constituting a part hereof and in which like reference characters designate like parts, Fig. 1 is an elevational view of a gear wheel embodying the principles of my invention, Fig. 2 is a cross-sectional view thereof taken along the line II—II of Fig. 1, Fig. 3 is a view partly in section and partly in elevation, of a gear element assembled upon the drive axle of a railway vehicle.

Fig. 4 is a partial cross-sectional view of a modified form of gear-wheel and drive wheel connection and Fig. 5 is a partial view, in section of another modification of the gear element shown in Figs. 1 and 2.

The gear-wheel of Figs. 1 and 2 comprises the usual hub 1 having a central opening 2 by which it is secured to a shaft or axle (not shown). The outer periphery of the hub 1 is provided with a spherically-curved surface 3, that is adapted to engage a correspondingly shaped seating surface of a gear element 4 having a fluted outer periphery 5 constituting gear teeth. The hub member 1 is provided with an extension 6 having a rim 7 secured thereon that is provided with recesses 8 to receive a plurality of spring nests 9. The spring nests 9 are adapted to fit in recesses or slotted openings 10 that are provided in a ring member 11, which is shrunk or otherwise secured on the gear rim 4.

A spring plate 12 is secured at its outer extremity to the ring 11, and an annular plate 13 is secured on the hub member as shown. The spherical portion 3 of the hub is provided with a plurality of openings 14 to effect lubrication of the engaging surfaces of the hub and gear rim with a suitable lubricant that is contained within the recessed portions of the hub and flexible element between the plates 12 and 13, respectively.

In Fig. 3, the gear element of Fig. 1 is mounted on the drive axle 15 of a flanged wheel 16, showing the relative location of the members.

Fig. 4 illustrates another form of mounting that necessitates slight changes in the other types of gear-wheel construction, which comprises a spherical hub portion 17 that is mounted on the shaft 18 and a gear rim 19 which has a spherically-curved seating surface 20 in engagement with the hub member 17. The gear rim is provided with slotted openings 21 that are adapted to receive spring nests 22, which are in engagement with an annular member 23 that is shrunk on an axially extending portion 24 of a flanged wheel 25. A lateral restraining spring 26, which is disposed in a slotted opening 27 of the wheel 25, is adapted to yieldingly restrain lateral movement or pressure exerted by the gear rim 19.

In Fig. 5, the illustrated construction comprises a hub 30, which is adapted to be secured on the shaft 31 and has radially extending spokes or arms 32 that are secured to a ring portion 33 by a plurality of bolts 34. A spherically-curved ring 35 is secured to the member 30 by a press fit or the like, and a gear rim 36 having a spherically-curved seating portion 37 is mounted on the member 35. A ring 38 having a recessed portion 39, which is adapted to receive a plurality of spring nests 40, is secured to the extending hub portion of the gear rim 36, and the ring 33 which is secured to the spoke of the hub 30, is likewise provided with slotted openings 41 that are adapted to receive the extended ends of the spring nests.

The functions of the above-described elements will be obvious from the illustration. The object of the resilient elements interposed between the gear rim and hub member or the gear and driving wheel is to permit of resilient angular movement of the gear wheel relative to the supporting or driving hub. The purpose of the spring plate 12 and the spring member 26 is to yieldingly restrain lateral movement of the gear wheel, while the object of the spherically-curved seating portion of the gear member is to provide universal movement of the hub relative to the gear.

The operating characteristics of the apparatus are such as to permit of disalinement of the shaft relative to the toothed rim portion of the gear-wheel in order to provide constant engagement of the gear teeth irrespective of the position or displacement of the hub axis. Thus, in a drive mechanism comprising a driving and a driven shaft or axle member, the one shaft or axle may be relatively distorted without affecting the meshing of the co-operating gear teeth. This type of gear element is especially applicable to motor-driven railway vehicles in that it provides a resilient drive that is capable of withstanding the shock and impact of the wheels and frames, thereby protecting the more delicately constructed electrical elements. Such a drive element further permits of relative movement of the motors and the vehicle frame and body.

Although I have described a specific embodiment of my invention, it will be obvious to those skilled in the art that various modifications may be made in the details of construction of the gear wheel, hub and connecting elements without departing from the principles herein set forth.

I claim as my invention:—

1. A gear element comprising a hub and a rim member having spherical engaging faces and a flexible connection therefor, said hub and rim member being relatively movable independently of said flexible connection.

2. A gear element comprising a hub and a rim member having spherical engaging faces and a flexible connection therefor, said hub having universal movement relatively to said rim member.

3. A gear element comprising a hub and a rim member having spherical engaging faces and a flexible connection therebetween for permitting relative universal movement of said hub and rim member.

4. A gear element comprising a hub having a spherically-curved flanged portion, a toothed rim movably mounted on said flanged portion, a plurality of spring elements connecting said rim and hub, and resilient lateral restraining means for said rim.

5. A gear element comprising a hub having a spherical flanged portion, a toothed rim movably mounted on said flanged portion, a plurality of spring elements comprising spring nests pivotally mounted in said hub and having their free ends in engagement with said rim, and a plate spring member associated with said rim and hub.

6. A gear element comprising a hub having a spherical flanged portion, a toothed rim movably mounted on said flanged portion, a plurality of spring elements connecting said rim and hub, and side plates enclosing said spring element and hub to constitute a lubricating chamber.

7. The combination with a gear element, of a shaft therefor, and resilient connecting means for said shaft and the toothed rim of the gear, said shaft and gear having spherical engaging faces for permitting universal movement of said rim relative to the said shaft.

In testimony whereof, I have hereunto subscribed my name this 23rd day of August, 1923.

CLAUDE BETHEL.